United States Patent [19]

Schildmeier

[11] 3,708,008

[45] Jan. 2, 1973

[54] TIRE LOADING AND TRUEING APPARATUS

[76] Inventor: John Henry Schildmeier, 6038 Crows Nest Drive, Indianapolis, Ind. 46208

[22] Filed: Dec. 14, 1970

[21] Appl. No.: 97,903

[52] U.S. Cl..................................................157/13
[51] Int. Cl. ...........................................B29h 21/08
[58] Field of Search.........................................157/13

[56] References Cited

UNITED STATES PATENTS

| 3,595,295 | 7/1971 | Curry........................................157/13 |
| 3,506,055 | 4/1970 | Bridgewater............................157/13 |
| 2,918,116 | 12/1959 | Mooney...................................157/13 |
| 3,556,194 | 1/1971 | Farrington..............................157/13 |

*Primary Examiner*—Granville Y. Custer, Jr.
*Attorney*—Woodard, Weikart, Emhardt & Naughton

[57] ABSTRACT

An apparatus for loading and trueing tires. A threaded rod supported by a pair of upstanding arms receives the tire and is rotatably driven. A floating roadbed having parallel rollers for contacting and loading the tire is forced against the tire by an expandable bag. The upstanding arms and tire are movable toward a cutting blade. A disc mounted to one end of the threaded rod receives graph paper on its outer surface, and a marking stylus is positioned over the graph paper being driven by a rod clamped to the floating roadbed.

4 Claims, 3 Drawing Figures

INVENTOR
JOHN HENRY SCHILDMEIER
BY
Woodard Weikart Emhardt & Naughton
ATTORNEYS

TIRE LOADING AND TRUEING APPARATUS

BACKGROUND OF THE INVENTION

1. Field of the Invention

This invention relates generally to a loading and trueing machine for tires, and more particularly to such an apparatus with a floating roadbed connected to an indicator.

2. Description of the Prior Art

Synthetic tires develop temporary flat spots when statically loaded. For example, an automobile having synthetic tires will develop flat spots at the point of contact between the ground and the tires when the automobile is parked or standing still for a period of time. These flat spots may be eliminated by dynamic loading of the tires typically by driving the automobile. Thus, the original casing memory is restored to the tires and the tires will assume a generally round configuration.

A tire may be out-of-round even though the flat spots resulting from static loading have been eliminated. The tread surface of circumference of the tire is in this case not perfectly circular with respect to the center axis of the mounting rim. It has been determined that an automobile tire having a size of 8.55 by 14 when driven at an approximate speed of 60 m.p.h. will develop a thumping movement which may be felt through the steering column if the tire is more than 0.030 inches out-of-round. It has been the practice in the industry to rotate these out-of-round ties and to cut off the high areas of the tire thereby producing a generally round tire. Two such devices are disclosed in the following U.S. Pat. Nos. 2,986,205 issued to Okerstrom and 3,003,545 issued to Peacock.

It can be appreciated that synthetic tires must first be dynamically loaded to eliminate the flat spots and return the original casing memory to the tire prior to cutting the high areas from the tire. The prior practice has been to mount the out-of-round tire to an automobile or to a loading machine to restore casing memory. The tire must then be removed from the automobile or loading machine and mounted to a cutting machine such as one of those disclosed in the above two patents. The present invention is an apparatus which allows the tire to be loaded to restore the casing memory and then to be cut removing the high places from the tire without requiring the transfer of the tire to another machine. A pair of indicators are provided on the machine to provide an approximate and an exact determination of the out-of-roundness of the tire. These indicators may be arranged to measure the movement of a floating roadbed which dynamically loads the tire.

SUMMARY OF THE INVENTION

A tire loading and trueing apparatus. A tire holder receives the tire and is operable to axially rotate the tire. The tire and tire holder are movable toward a cutting blade operable to remove a portion of the tread surface from the rotating tire. A floating roadbed movable against the tread surface restores the casing memory to the tire. An expandable bag is operable to force the bed against the tread surface of the tire thereby radially loading the rotating tire.

It is an object of the present invention to provide an apparatus for analyzing the roundness of the tire which also has loading and cutting means for producing a round tire.

It is a further object of the present invention to provide a tire loading and trueing apparatus which allows axial loading of the tire and then cutting of the tire without the necessity for transferring the tire to an additional machine.

Yet another object of the present invention is to provide a tire loading and trueing apparatus having a pneumatically driven floating roadbed for restoring the casing memory to the tire.

In conjunction with the above objects, it is an object of the present invention to provide a tire loading and trueing apparatus having an indicator for recording movement of the floating roadbed.

Related objects and advantages of the present invention will be apparent from the following description.

DESCRIPTION OF THE PREFERRED EMBODIMENT

Figure 1:
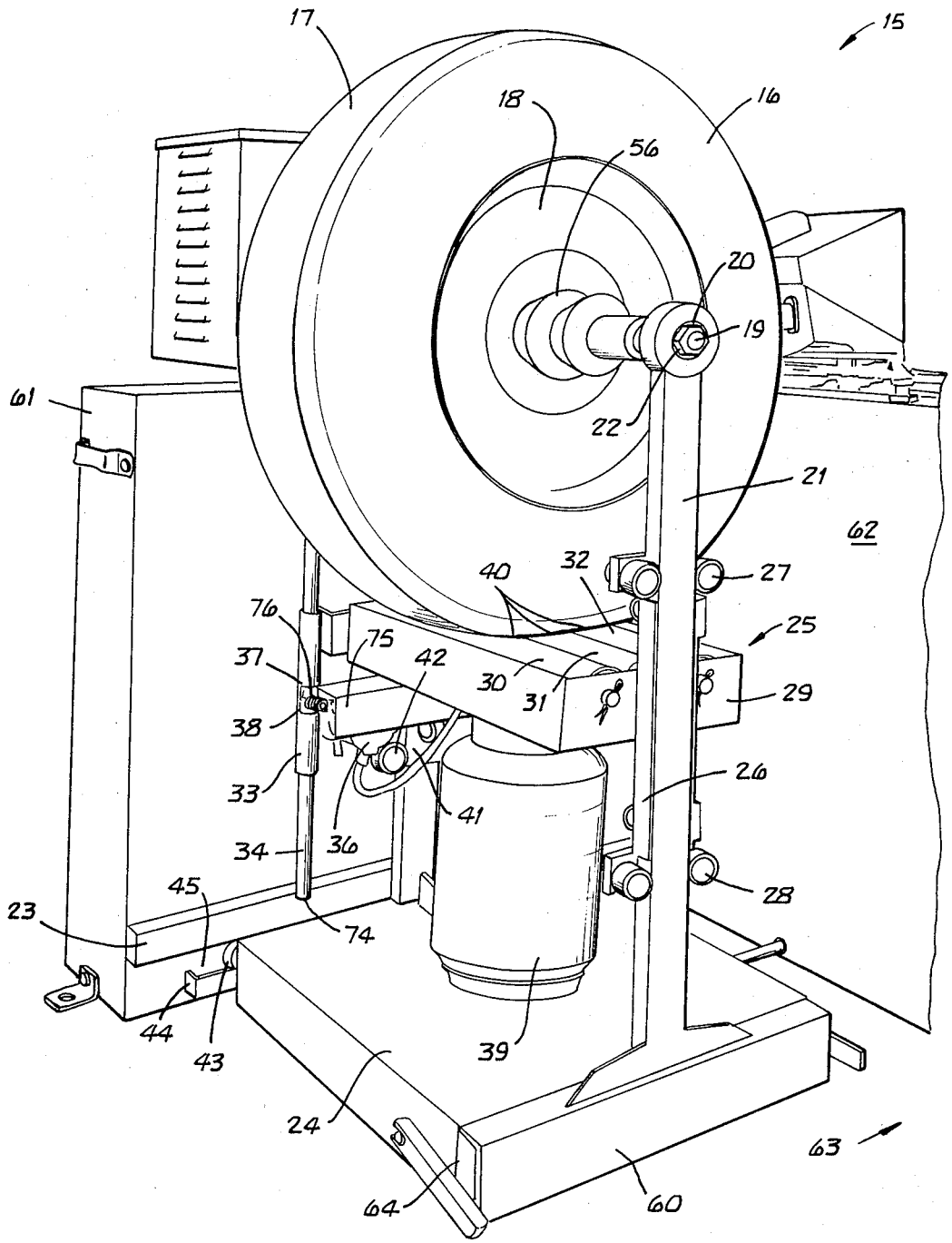
FIG. 1 is a side perspective view of the tire loading and trueing apparatus incorporating the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
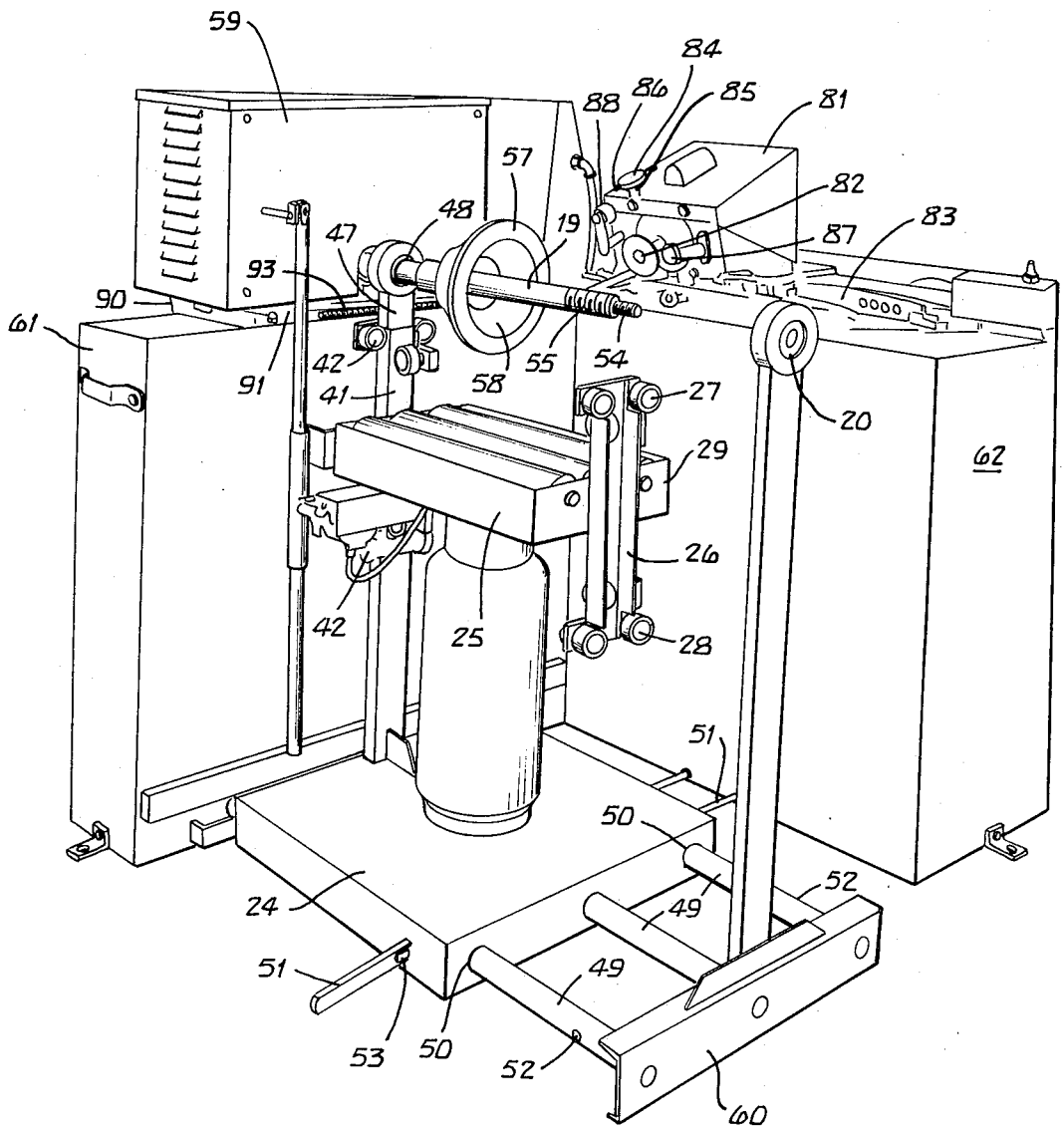
FIG. 2 is the same view as FIG. 1 with the tire removed from the apparatus and with the floating roadbed positioned in a different location.

Referring now more particularly to FIG. 1, there is shown a tire loading and trueing apparatus 15 having a tire 16 mounted thereon. The tire is made from synthetic material having a tread surface 17 and being mounted on a standard automobile or truck rim 18. FIG. 2 is the same view as FIG. 1 only with the tire removed from the apparatus. A threaded rod 19 is rotatably driven by a motor within cabinet 59 and extends freely through bearings 48 provided in arm 47 fixedly mounted to base 24. A conical female sleeve 57 is fixedly secured to threaded rod 19 having a hollow interior 58 for partially receiving conical male sleeve 56 (FIG. 1). Sleeve 56 is threadedly received by threads 55 of rod 19 and extends through the center of rim 18 into interior 58. Thus, the tire and rim may be securely mounted between sleeves 56 and 57. The free end of rod 19 has threads 54 for receiving a hexagonally shaped nut 22. Arm 21 is fixedly mounted to channel 60 having three parallel rods 49 extending through bearings 50 of base 24. Bearings 20 are provided in the top end of arm 21 for rotatably receiving threaded rod 19. After the tire and rim have been installed on rod 19, sleeve 56 is then threaded onto the rod and arm 21 is moved toward the tire until rod 19 extends out through bearings 20. Nut 22 is then threaded on rod 19. A pair of locking levers 51 are pivotally mounted to the sides of base 24 having locking pins 53 for positioning in holes 52 of rods 49. Thus, when channel 60 abuts base 24 holes 52 are aligned with pins 53 and levers 51 may be pivoted inward to the position shown in FIG. 1 thereby locking channel 60 and arm 21 in place.

Base 24 is movable in a direction toward or opposite of arrow 63 by threaded rod 93 fixedly connected to a guided bearing box on slide guide rails 91 for moving threaded rod 19 to cabinet 62. Threaded rod 93 is connected to suitable crank handles to enable the operator to move base 24 to and from cabinet 62. The base has multiple bearings which ride in channel 45 formed by bar 44. Only one bearing 43 is shown in FIG. 1; however, it is understood that many bearings identical to bearings 43 are provided along the side of base 24 enabling the base to be moved freely toward and from cabinet 62. A top bar 23 attached to cabinet 61 is positioned adjacent channel 45 to prevent bearings 43 from disengaging the channel. The free end 64 of base 24 is spaced away from the floor and may have suitable rollers or wheels positioned thereunder for supporting base 24. Rod 19 extends into cabinet 59 which is slidably mounted on rails 90 and 91 atop cabinet 61. Thus, horizontal movement of base 24 also results in horizontal movement of cabinet 59 with respect to cabinet 61. A floating roadbed 25 (FIG. 1) has three parallel rollers 30, 31 and 32 rotatably mounted within frame 29. Fixedly attached to the ends of frame 29 are channels 26 and 41 which slidingly engage respectively arms 21 and 47. Channel 26 has a pair of top bearings 27 and a pair of bottom bearings 28 which engage the sides of arm 21 thereby allowing the bed to move in a vertical direction. Likewise, channel 41 has a pair of top and bottom bearings 42 for slidingly engaging arm 47. A standard expandable air bag 39 has a bottom end attached to base 24 and a top end attached to frame 29. The rollers of bed 25 may be forced against tread surface 17 by pressurizing bag 39. Synthetic tires typically develop a flat spot within the casing of the tire. This results from the force of the vehicle on the tire when the tire is not rotating. Subsequent rotation of the tire while loaded results in restoration of the casing memory thereby eliminating the flat spot. The rollers of the floating roadbed are forced against tire 16 producing a flat loading contact area 40 while the tire is rotating. This will sufficiently load the tire so as to eventually restore the casing memory to the tire eliminating the flat spots. The cutting operation may then be performed on the tire as will be described later in the specification.

Figure 3:
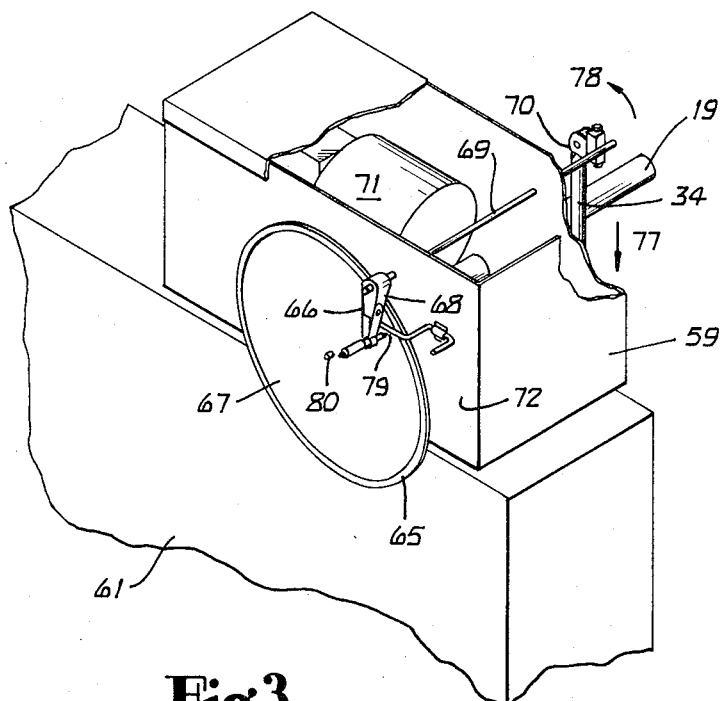
FIG. 3 is a fragmentary perspective view of the apparatus of FIG. 1 particularly showing the graph and stylus indicating means.

FIG. 3 is a fragmentary perspective view of the apparatus shown in FIG. 1 particularly showing an indicator which provides a permanent record of the tire's contour. Threaded rod 19 extends through cabinet 59 and is rotatably driven by a conventional motor 71. The opposite end of rod 19 extends through the outer wall 72 of cabinet 59 and is fixedly attached to indicator disc plate 65. Thus, plate 65 will rotate one revolution with every revolution of axle 19 and tire 16. Graph paper 67 is removably mounted to plate 65 by magnetic strips or other suitable fastening devices. A stylus 66 having a marking end 79 for producing a mark on paper 67 is fixedly attached to bracket 68 mounted to the end of rod 69. The opposite end of rod 69 is fixedly attached to bracket 70 secured to rod 34. Rod 34 (FIG. 1) extends downward and has a free bottom end 74. Rod 34 passes freely through tube 33 integrally attached to frame 29. Tube 33 is provided with an opening 37 aligned adjacent to arcuate shaped clamp 38. An air cylinder 36 mounted to bracket 75 integrally attached to frame 29 has a movable piston rod 76 attached to clamp 38. Thus, activation of pneumatic cylinder 36 results in clamp 38 passing through opening 37 of tube 33 and allows the clamp to grip rod 34. Rod 34 will then move vertically along with bed 25. Movement of rod 34 is translated into markings by stylus 66. For example, a high spot in tire 16 will result in downward movement of bed 25. Assuming the clamp 38 is abutting against rod 34, the downward movement of bed 25 will force rod 34 to move in the direction of arrow 77 (FIG. 3). Downward movement of rod 34 will result in rotation of rod 69 in the direction of arrow 78 thereby forcing the marking tip 79 of stylus 66 away from the center 80 of graph paper 67. Thus, a high spot of the tire will be marked as a high spot or bump on graph paper 67. A similar analysis applies for a low spot of the tire.

Box 81 (FIG. 2) is movably mounted atop a bowed spring 83 fixedly fastened to cabinet 62. Box 81 has a cutting blade 82 which is utilized to cut the tire. Box 81 may be moved along the bowed spring 83 thereby allowing cutter 82 to follow the general convex shape of the tire tread surface. Blade sharpeners 87 and 88 are mounted to box 81 and may be moved in toward blade 82 for sharpening purposes. Box 81 as well as the cutting blade and sharpeners are quite conventional and are well known in the art. Such a blade and sharpeners are disclosed in U.S. Pat. Nos. 2,986,205 and 3,003,545. A standard needle indicator 84 is mounted to box 81 having a needle 86 which may be moved to abut the tread surface of the tire. The needle is connected to a numbered gage face 85 on the indicator to indicate the position of the needle. Thus, as the box is moved along spring 83 needle 86 will follow the contour of the tire thereby indicating the high and low spots.

After the tire has been mounted to rod 19 and rotation of the tire has been initiated, pneumatic bag 39 should be pressurized forcing rollers 30, 31 and 32 of bed 25 to engage the tire producing the loaded surface 40 as shown in FIG. 1. Continued rotation of the tire while loaded by bed 25 for a short duration, approximately 1 minute, will restore the casing memory to the tire and eliminate any flat spots in the tire resulting from static loading of the tire. Base 24 is then moved toward cabinet 62 along with tire 16 by withdrawing rod 46 slowly into cabinet 62. Eventually, cutting blade 82 will abut the tread surface of the tire thereby cutting the tire. The cutting blade may be swung across the tread surface of the tire by moving box 81 along spring 83. After an initial cut has been accomplished, cylinder 36 is energized thereby clamping rod 34 securely to frame 29. Thus, movement of bed 25 will also result in vertical movement of rod 34. A permanent record of the outline of the tire is then marked onto the graph paper. A rough approximation of the out-of-roundness of the tire is thus provided by the graph paper. In the event that a more accurate measurement is desired, indicator 84 may be utilized. The needle indicator provides an exact measurement down to 0.001 inch while the graph indicator provides only an approximation. In the event that the tire is out-of-round sufficiently so as to be unacceptable, an additional cut may be taken.

The permanent record of the outline of the tire marked on the graph paper provides a permanent record or history of the tire. In addition, the graph paper indicator provides a quick approximation of the out of roundness of the tire whereas the needle indicator, although not as easy to read as the graph paper indicator, provides a more accurate determination of the out of roundness. In certain cases, a limited amount of out of roundness of the tire within the tolerance of the graph paper indicator is acceptable and thus, only the graph paper indicator is utilized. In other cases, less out of roundness of the tire is acceptable and thus, the needle indicator is utilized.

Many variations in the present invention are contemplated and included by this specification. For example, needle indicator 84 may be mounted adjacent bed 25 in lieu of on top of box 81. The needle indicator when mounted adjacent to the floating roadbed would provide an exact measurement of the movement of the bed. It will be evident from the above description that the present invention provides a tire loading and trueing apparatus. It will also be evident that this apparatus allows the operator to load the tire to restore the casing memory and to then cut the tire to eliminate the high spots of the tire without necessitating remounting of the tire to a second machine. In addition, it will be evident from the above description that the present invention provides a tire loading and trueing apparatus having a pneumatically driven floating roadbed for restoring casing memory to the tire. The apparatus also has an indicator which will record vertical movement of the floating roadbed.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. An apparatus for changing an out-of-round tire into a round tire comprising:

a tire holder receiving said tire and operable to axially rotate said tire, said tire having a tread surface;

a floating roadbed movable against said tread surface of said tire;

a cutter operable to remove a high portion of said tread surface while said tire is rotating under load of said floating roadbed;

a first indicator connected to said roadbed indicating movement of said roadbed with said tire rotating;

means connected to said roadbed and operable to radially load said tire with said roadbed as said tire is rotating; and wherein:

said means is an expandable pneumatic bag;

said roadbed has a frame with parallel rollers rotatably mounted thereon;

said first indicator has a stylus and a circular graph, said graph is connected to said holder so as to rotate with said holder, said stylus is positioned against said graph and is removably connected to said roadbed.

2. The apparatus of claim 1 and further comprising:

a second indicator operable to measure the contour of said tire.

3. The apparatus of claim 2 additionally comprising:

a base having said holder, said roadbed and said means mounted thereto, said base and said first indicator being movable as a unit to and from said cutter.

4. An apparatus for changing an out-of-round tire into a round tire comprising:

a tire holder receiving said tire and operable to axially rotate said tire, said tire having a tread surface;

a floating roadbed movable against said tread surface of said tire;

a cutter operable to remove a high portion of said tread surface while said tire is rotating under load of said floating roadbed;

means connected to said roadbed and operable to radially load said tire with said roadbed as said tire is rotating; and wherein:

said holder has a pair of upstanding arms with top bearing ends, said holder also has a horizontal threaded rod extending axially through said tire and rotatably mounted to and through said ends, one of said arms is movable to and from said other arm and said rod; and, said roadbed has a frame with a pair of vertically extending channels or guides affixed thereto with bearing slidably engaging said arms.

* * * * *